(12) United States Patent
Nakanishi et al.

(10) Patent No.: US 7,884,172 B2
(45) Date of Patent: Feb. 8, 2011

(54) TETRAGLYCIDYL ETHER OF 1,1,2,2-TETRAKIS(HYDROXYPHENYL)ETHANE

(75) Inventors: Masataka Nakanishi, Kita-ku (JP); Katsuhiko Oshimi, Kita-ku (JP); Ryutaro Tanaka, Kita-ku (JP); Toru Kurihashi, Kita-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 170 days.

(21) Appl. No.: 12/083,284

(22) PCT Filed: Oct. 10, 2006

(86) PCT No.: PCT/JP2006/320184

§ 371 (c)(1),
(2), (4) Date: Jun. 2, 2008

(87) PCT Pub. No.: WO2007/046262

PCT Pub. Date: Apr. 26, 2007

(65) Prior Publication Data

US 2009/0131607 A1    May 21, 2009

(30) Foreign Application Priority Data

Oct. 18, 2005   (JP) .............................. 2005-302619

(51) Int. Cl.
*C08G 59/06*   (2006.01)
*C08L 63/00*   (2006.01)

(52) U.S. Cl. .......................... 528/98; 525/423; 525/481; 525/523; 525/532; 525/533; 528/88

(58) Field of Classification Search ....................... None
See application file for complete search history.

(56) References Cited

U.S. PATENT DOCUMENTS 4,668,807 A * 5/1987 Darbellay et al. ........... 549/542

FOREIGN PATENT DOCUMENTS

| JP | 57-38814 |   | 3/1982 |
|---|---|---|---|
| JP | 58-134112 A | * | 8/1983 |
| JP | 7-173089 A | * | 7/1995 |
| JP | 9-12677 |   | 1/1997 |
| JP | 9-12677 A | * | 1/1997 |
| JP | 10-87537 A | * | 4/1998 |
| JP | 2003-21898 A | * | 1/2003 |
| JP | 2005-220300 |   | 8/2005 |
| JP | 2005-220300 A | * | 8/2005 |

* cited by examiner

*Primary Examiner*—Robert Sellers
(74) *Attorney, Agent, or Firm*—Nields, Lemack & Frame, LLC

(57) ABSTRACT

To provide an epoxy resin giving a cured object having high heat resistance, which is improved in impact resistance and moisture resistance as compared with conventional high-heat-resistance epoxy resins.

The epoxy resin is obtained by glycidylating one or more phenol compounds comprising 95% or more 1,1,2,2-tetrakis(hydroxyphenyl)ethane, and is characterized in that in an examination by gel permeation chromatography, the epoxy resin has a tetranucleus-form content of 50 to 90% by area and an octanucleus-form content of at least 5% by area and has a total chlorine content of 5,000 ppm or smaller.

6 Claims, No Drawings

TETRAGLYCIDYL ETHER OF 1,1,2,2-TETRAKIS(HYDROXYPHENYL)ETHANE

TECHNICAL FIELD

The present invention relates to a polyfunctional epoxy resin having excellent heat resistance, an epoxy resin composition containing the epoxy resin, a photosensitive resin composition and a cured object obtained therefrom.

BACKGROUND ART

Epoxy resins form cured objects that are generally excellent in the mechanical properties, water resistance, chemical resistance, heat resistance, electrical properties and the like, when cured with various curing agents, and are used in a wide range of applications such as adhesives, coating materials, laminate plates, molding materials and casting materials.

As for the epoxy resins, those which are in a liquid state at normal temperature, or those having a softening point of about 50 to 100° C., are generally used. In recent years, the epoxy resins or cured objects thereof used in the above-described applications are required to have higher purity as well as further improvements in various properties such as heat resistance, moisture resistance, adhesiveness, low dielectric constant, fast curability, fire retardancy and high toughness. Among them, further technical development in the fields such as electric/electronic industrial applications, automobile applications and aerospace applications, has resulted in even stronger demand for superior heat resistance, moisture resistance and toughness.

Furthermore, as another problem in using epoxy resins, there may be mentioned the storage stability of the resins. That is, the methods for using an epoxy resin include a two-liquid type method where the epoxy resin is stored separately from a curing agent or the like, and the resin is mixed with the other components at the time of use, and a one-liquid type method where the epoxy resin is stored in a state mixed with a curing agent and the like from the beginning. Although the one-liquid type method is advantageous in terms of workability, there is raised a problem that the epoxy resin and the curing agent slowly react with each other during the storage, and there occur changes in the viscosity in the case of liquid compositions, or changes in the fluidity in the case of solid compositions.

Furthermore, recently photosensitive resin compositions are increasingly used because of their convenience in the curing conditions and workability. However, since simply curing with light results in low moisture resistance and heat resistance of the resin compositions, it is not possible to achieve the high degree of reliability that is required from electric/electronic materials. Thus, in recent years, photo- and-heat-curable resins in particular are attracting interest. For example, in the applications of solder resist, supplementary ink, overcoat, various adhesives and the like, there have been used epoxy resin compositions which are characterized in that an epoxy resin is added to the components of such material, and the mixture is subjected to primary curing with light, and then to secondary curing by heating. In such applications, maintaining the storage stability of epoxy resins up to the secondary curing becomes critical. For such reasons, crystalline epoxy resins are attracting attention.

As such an epoxy resin, there has been reported a crystalline tetrafunctional epoxy resin, for example, an epoxy resin obtained by glycidylating 1,1,2,2-tetrakis(hydroxyphenyl)ethane (Patent Document 1). This epoxy resin has a melting point close to 180° C., and it is reported that an epoxy resin composition containing this epoxy resin undergoes almost no change over time even if left to stand at 80° C. for a long time, and has excellent storage stability, thus resulting in high heat resistance of a cured object obtained therefrom (Patent Document 2). However, since the subject compound is highly pure, and has low compatibility with other components (for example, curing agent) in the case of curing the epoxy resin composition, it is difficult to make the crystals completely compatibilized before the initiation of curing and the formation of a uniformly cured object is difficult, and thus there remain problems in, for example, impact resistance and moisture resistance. Also, as a method for producing an epoxy resin by glycidylating 1,1,2,2-tetrakis(hydroxyphenyl)ethane, Patent Document 2 describes a method of allowing 1,1,2,2-tetrakis (hydroxyphenyl)ethane and epihalohydrin to react in a glycidylation reaction, subsequently adding water to the system, and eliminating epihalohydrin by azeotropically boiling the system, to thus precipitate the crystals of the desired epoxy resin in water. However, in this method, there are cases where the epoxy resin partially undergoes ring-opening, and impurities derived from water or epihalohydrin may remain behind in the resin. Thus, there is a problem that the total amount of chlorine remaining in the resin may become large.

Patent Document 3 also describes a method for producing such epoxy resin, the method including precipitating crystals in a convenient manner by using a solvent whose boiling point is higher by 30° C. or more than that of epihalohydrin in the glycidylation reaction. However, this method may have adverse effects since the high boiling point solvent is incorporated into the crystal system, and remains behind within the crystals even after drying the crystals. Further, Patent Document 4 uses a technique of allowing 1,1,2,2-tetrakis(hydroxyphenyl)ethane and epihalohydrin to react in a glycidylation reaction, subsequently heating and distilling off the organic solvent from the reaction liquid under reduced pressure, combining an arbitrary organic solvent with the resulting residue, and precipitating out crystals. However, since the melting point of the product is very high, there is a risk that crystallization takes place inside the reactor during the time of distilling off the solvent. Thus, this method is industrially disadvantageous, and also, the yield is poor.

Patent Document 1: Japanese Patent Application Laid-open No. 9-3162
Patent Document 2: Japanese Patent Application Laid-open No. 2004-43533
Patent Document 3: Japanese Patent Application Laid-open No. 2005-200527
Patent Document 4: Japanese Patent Application Laid-open No. 2005-220300

DISCLOSURE OF THE INVENTION

Problems to be Solved by the Invention

It is an object of the present invention to provide an epoxy resin giving a cured object having high heat resistance, which epoxy resin has improved impact resistance or moisture resistance compared to conventional highly heat resistant epoxy resins.

Means for Solving the Problems

Thus, the present invention relates to:
(1) an epoxy resin obtained by glycidylating a phenol compound which contains 1,1,2,2-tetrakis(hydroxyphenyl)ethane in an amount of 95% by area or more based on the measurement by gel permeation chromatography, the epoxy resin having a content proportion of a tetranuclear species of 50 to 90% by area, and a content proportion of an octanuclear species of 5% by area or more, both based on the measurement by gel permeation chromatography, and a total chlorine content of 5000 ppm or less;

(2) the epoxy resin according to (1) above, wherein the content proportion of an epoxy compound having a skeleton represented by the following formula (1):

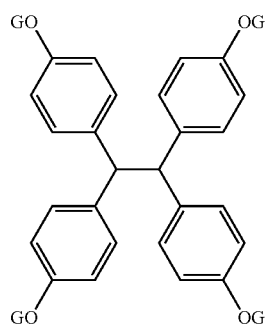

(1)

wherein G represents a glycidyl group, is 50 to 75% by area based on the measurement by high performance liquid chromatography, and the content proportion of the octanuclear species is 5 to 35% by area based on the measurement by gel permeation chromatography;

(3) an epoxy resin composition comprising the epoxy resin according to (1) or (2) above, and a curing agent;

(4) a photosensitive resin composition comprising the epoxy resin according to (1) or (2) above, and a compound having an ethylenic unsaturated group, and (5) A cured object obtained by curing the epoxy resin composition according to (3) above or a photosensitive resin composition according to (4) above.

Effects of the Invention

The epoxy resin of the present invention is an epoxy resin giving a cured object which is improved in brittleness and water resistance, compared to the conventional highly heat resistant epoxy resins obtained by glycidylating a phenol resin which is a condensate of glyoxal and phenol. Furthermore, the epoxy resin of the present invention is crystalline, and a resin composition having excellent thermal stability can be obtained by dispersing the epoxy resin of the present invention in a heat-curable epoxy resin composition or a photosensitive resin composition (photo-and-heat-curable resin composition). Therefore, the epoxy resin composition or photosensitive resin composition of the present invention is highly useful for a wide range of uses such as in electric/electronic materials, molding materials, casting materials, laminate materials, coating materials, adhesives, resists and optical materials.

BEST MODE FOR CARRYING OUT THE INVENTION

The present invention relates to an epoxy resin obtained by glycidylating a phenol compound which contains 1,1,2,2-tetrakis(hydroxyphenyl)ethane in an amount of 95% by area or more based on the measurement by gel permeation chromatography, the epoxy resin containing 50 to 90% by area of a tetranuclear species (by gel permeation chromatography) and 5% by area or more of an octanuclear species (by gel permeation chromatography). Here, the tetranuclear species refers to a compound having four benzene nuclei, and for example, there may be mentioned a compound represented by formula (1):

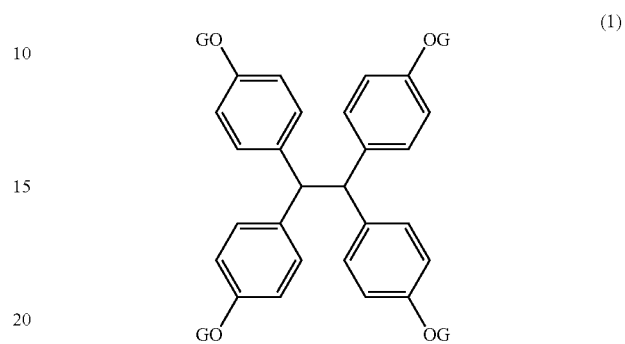

(1)

wherein G represents a glycidyl group, a compound in which some of the glycidyl groups of the compound of formula (1) have been ring-opened by water, and the like. The octanuclear species refers to a compound having eight benzene nuclei, and for example, there may be mentioned a compound of formula (2), which is a dimer of the compound of formula (1) as will be described later, and the like.

The phenol compound containing 95% by area or more of 1,1,2,2-tetrakis(hydroxyphenyl)ethane can be obtained by, for example, allowing glyoxal and phenol to react under acidic conditions, and then performing recrystallization, and specifically, the synthetic method described in Japanese Patent No. 2897850 or Japanese Patent No. 3381819 can be employed.

As for the method of glycidylating the above-described phenol compound, known methods can be employed. For example, the phenol compound and epihalohydrin are reacted in the presence of an alkali metal hydroxide.

In the reaction for obtaining the epoxy resin of the present invention, the alkali metal hydroxide used may be a solid product, or may be in the form of an aqueous solution. In the case of using an aqueous solution, a method of adding an aqueous solution of the alkali metal hydroxide continuously into the reaction system, while at the same time, eluting water and epihalohydrin continuously under reduced pressure or under normal pressure, then partitioning the reaction liquid, and eliminating water while continuously returning epihalohydrin to the reaction system, may be used favorably. The amount of use of the alkali metal hydroxide is usually 0.9 to 2.5 moles, and preferably 0.95 to 2.0 moles, per one equivalent of the hydroxyl group of the phenol compound used. It is more preferable to use a theoretical equivalent or more of the alkali metal, and it is even more preferable to use the alkali metal in an amount ranging from 1.0 to 2.0 equivalents.

In the present reaction, a quaternary ammonium salt may be added as a catalyst, if necessary, in order to conduct the reaction conveniently. The quaternary ammonium salt that can be used may be exemplified by tetramethylammonium chloride, tetramethylammonium bromide, trimethylbenzylammonium chloride, or the like. The amount of use of the quaternary ammonium salt is usually 0.1 to 15 g, and preferably 0.2 to 10 g, per one equivalent of the hydroxyl group of the phenol compound.

The amount of use of epihalohydrin is usually 0.8 to 12 moles, preferably 0.9 to 11 moles, and more preferably 3.5 to 8.5 moles, relative to 1 mole of the hydroxyl group of the phenol compound. As for the epihalohydrin compound, it is convenient to use an epichlorohydrin derivative from industrial aspects. In this case, it is preferable to perform the reaction after adding an alcohol such as methanol, ethanol, propyl alcohol or butanol, so as to increase the solubility of the phenol compound.

In the case of using an alcohol, the amount of use thereof is usually 2 to 30% by weight, and preferably 4 to 20% by weight, based on that of epihalohydrin.

The reaction temperature is usually 30 to 90° C., and preferably 35 to 80° C. The reaction time is usually 0.5 to 10 hours, and preferably 1 to 8 hours.

The reaction liquid of such glycidylation reaction is purified by washing with water, and then an epihalohydrin solution of an epoxy resin can be obtained.

For example, Patent Document 1 describes a method of obtaining a purified 1,1,2,2-tetrakis(glycidyloxyphenyl) ethane (a tetranuclear species) by distilling off epihalohydrin from the above epihalohydrin solution, adding another solvent, and inducing recrystallization. Because the epoxy resin thus obtained has an excessively high concentration of the tetrafunctional species, when prepared into an epoxy resin composition, the epoxy resin has poor compatibility with other resin components, and has had adverse effects on the properties of the cured object, such as impact resistance. According to the present invention, an improvement of the properties is implemented by simultaneously retrieving the octanuclear species that is obtained simultaneously during the glycidylation reaction, specifically, for example, a compound represented by the following formula (2):

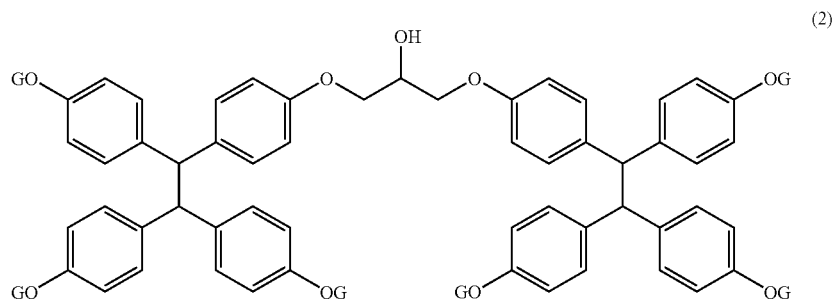

(2)

wherein G represents a glycidyl group.

There may be listed various methods as the method for taking out the epoxy resin of the present invention from the above epihalohydrin solution, but specifically, a method such as described below may be mentioned.

<Step 1>

While heating under reduced pressure, excess epihalohydrin or the like is partially recovered.

The amount of epihalohydrin to be recovered is preferably an amount leaving the solution with a resin concentration of 40 to 90% by weight, and more preferably 50 to 80% by weight. The heating temperature in this case is usually 40 to 140° C., and preferably 50 to 110° C.

<Step 2>

A water-soluble solvent is added to prepare a water-soluble solution or suspension.

Examples of the water-soluble solvent include aprotic polar solvents such as dimethylsulfoxide, N,N'-dimethylformamide, N-methylpyrrolidone, acetone, diglyme and triglyme; alcohols such as methanol, ethanol, isopropanol, n-butanol, t-butanol, ethylene glycol, propylene glycol and propylene glycol monomethyl ether; and the like. However, a solvent whose boiling point is higher by 30° C. or more than that of the epihalohydrin used is not preferable, since such an organic solvent is likely to be incorporated into produced epoxy resin powders, and the solvent cannot be removed even if sufficiently dried, and also may cause coloration or the like during heating, thus having a potential to exert adverse effects. Therefore, as preferred water-soluble solvents that can be used herein, there may be mentioned ketones such as acetone; esters such as ethyl lactate; alcohols such as methanol, ethanol, isopropanol, n-propanol, n-butanol and t-butanol; and the like. The present process uses the water-soluble solvents mentioned above as essential components. However, in this case, other solvents can also be used in combination, and examples of the solvents that can be used in combination include ester-based organic solvents such as ethyl acetate and butyl acetate, ketone-based organic solvents such as methyl isobutyl ketone, methyl ethyl ketone and methyl isobutyl ketone; and aromatic organic solvents such as toluene and xylene. The amount of use of these solvents is usually 20 to 500% by weight, and preferably 50 to 300% by weight, based on the theoretical yield of the epoxy resin.

<Step 3>

Water is added, and crystals are sufficiently precipitated out.

The water used herein may be any water, but it is desirable to use ion-exchanged water since use of tap water may add chlorine ions. The temperature of the water used is usually 0 to 70° C., and preferably 15 to 50° C. Caution should be taken, because water at too high temperature may cause fusion of dispersed crystals. The amount of use of water is usually 20 to 500% by weight, and preferably 50 to 300% by weight, based on the theoretical yield of the epoxy resin. In this manner, the epoxy resin of the present invention can be obtained as a crystal powder.

The crystalline epoxy resin thus obtained contains a tetranuclear species in an amount of 50 to 90% by area (value measured by gel permeation chromatography (GPC)), and contains in particular an epoxy compound having the skeleton represented by the formula (1) described above in an amount of 50 to 75% by area (value measured by high performance liquid chromatography (HPLC)) (Hereinafter, the content proportion of a compound referred to by the number of nuclei is expressed in the value measured by GPC, while the content proportion of a compound referred to by specifying the structural formula is expressed in the value measured by HPLC).

Components other than those include compounds resulting from the reaction between the phenol compound and epihalohydrin, and an octanuclear species, which is represented for example by the epoxy compound represented by the formula (2), which is a compound formed from binding a portion of 1,1,2,2-tetrakis(hydroxyphenyl)ethane with epihalohydrin, is contained in an amount of 5% by area or more.

Although the content of the octanuclear species is associated with the improvements in the mechanical properties and compatibility, if the content is too high, for example, if the content exceeds 35% by area, the crystallinity of the epoxy resin is deteriorated, and it may become difficult to obtain crystals. Thus, the content of the octanuclear species is preferably 5 to 35% by area, more preferably 7 to 25% by area, and even more preferably 9 to 16% by area.

One of the features of the epoxy resin of the present invention is that the total chlorine content is low. In the production method according to Patent Document 2, the total chlorine content frequently exceeds 5000 ppm as described above, and in many cases, the amount exceeds 10000 ppm. Compared with this, the epoxy resin of the present invention is produced by a method that is relatively mild, and thus less ring-opening of the epoxy group occurs, while a less amount of impurities are incorporated into the resin. The total chlorine content in the epoxy resin of the present invention is 5000 ppm or less, and the total chlorine content obtained under preferred conditions is 4000 ppm or less. Thus, such an epoxy resin is particularly suitable in the case of being used in electronic elements. In particular, when the total chlorine content is high, discoloration may occur under thermally or electrically strict conditions, and in the case of using the epoxy resin particularly for the solder resist use, the external appearance such as gloss and color represents an important factor. Thus, it is desirable to have low total chlorine content.

The epoxy resin of the present invention can be used in the form of a heat-curable epoxy resin composition containing a curing agent, together with another epoxy resin, as necessary. From this epoxy resin composition, a heat resistant cured object can be obtained, which object can be used in a variety of applications. Further, the epoxy resin of the present invention can also be used together with a photopolymerization initiator and a compound having an ethylenic unsaturated group, therefore in the form of a photosensitive resin composition.

Hereinafter, the epoxy resin composition of the present invention will be described.

For the epoxy resin composition of the present invention, the epoxy resin of the present invention can be used alone, or in combination with other epoxy resin. In the case of combined use, the mixing ratio of the respective epoxy resins can be arbitrarily varied. For example, the amount of the other epoxy resin can be varied within the range of about 0 to 500 parts by weight, and usually about 0 to 300 parts by weight, relative to 100 parts by weight of the epoxy resin of the present invention. As an example of the case of combined use, there may be mentioned a combination of using the other epoxy resin in the range of about 10 to 200 parts by weight, preferably about 20 to 150 parts by weight, and more preferably about 30 to 120 parts by weight, relative to 100 parts by weight of the epoxy resin of the present invention.

The proportion of the epoxy resin of the present invention in the epoxy resin composition of the present invention can be widely varied, and for example, can be varied in the range of about 1 to 98% by weight, preferably about 3 to 95% by weight, and more preferably about 5 to 90% by weight, relative to 100 parts by weight of the total amount of the composition, while the remainder includes a curing agent and other additives that are added as necessary, for example, another epoxy resin, a solvent and other additives.

Specific examples of the other epoxy resin that can be used in combination with the epoxy resin of the present invention, include glycidyl ether-based epoxy resins obtained by glycidylating polycondensates of bisphenols (bisphenol A, bisphenol F, bisphenol S, biphenol, bisphenol AD and the like) or phenols (phenol, alkyl-substituted phenol, aromatic-substituted phenol, naphthol, alkyl-substituted naphthol, dihydroxybenzene, alkyl-substituted dihydroxybenzene, dihydroxynaphthalene and the like) with various aldehydes (formaldehyde, acetaldehyde, alkylaldehyde, benzaldehyde, alkyl-substituted benzaldehyde, hydroxybenzaldehyde, naphthaldehyde, glutaraldehyde, phthalaldehyde, crotonaldehyde, cinnamaldehyde and the like); polymers of phenols with various diene compounds (dicylopentadiene, terpenes, vinylcyclohexene, norbornadiene, vinylnorbornene, tetrahydroindene, divinylbenzene, divinylbiphenyl, diisopropenylbiphenyl, butadiene, isoprene and the like); polycondensates of phenols with ketones (acetone, methyl ethyl ketone, methyl isobutyl ketone, acetophenone, benzophenone and the like); polycondensates of phenols with aromatic dimethanols (benzenedimethanol, biphenyldimethanol and the like); polycondensates of phenols with aromatic dichloromethyls ($\alpha,\alpha'$-dichloroxylene, bischloromethylbiphenyl and the like); polycondensates of phenols with aromatic bisalkoxymethyls (bismethoxymethylbenzene, bismethoxymethylbiphenyl, bisphenoxymethylbiphenyl and the like); polycondensates of bisphenol compounds with various aldehydes; and alcohols; alicyclic epoxy resins; glycidylamine-based epoxy resins; glycidyl ester-based epoxy resins; and the like, but the other epoxy resin is not limited to these as long as it is a conventionally used epoxy resin. These compounds may be used individually or in combination of two or more species.

The epoxy resin composition of the present invention contains a curing agent. Examples of the curing agent include amine-based compounds, acid anhydride-based compounds, amide-based compounds, phenol-based compounds and the like, and for example, the following curing agents of (a) to (e) may be listed.

(a) Amine-based compounds, for example, diaminodiphenylmethane, diethylenetriamine, triethylenetetramine, diaminodiphenylsulfone, isophoronediamine and the like;

(b) Acid anhydride-based compounds, for example, phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride and the like;

(c) Amide-based compounds, for example, dicyandiamide, polyamide resins synthesized from a dimer of linoleic acid and ethylenediamine, and the like;

(d) Phenol-based compounds, for example, (i) polyhydric phenols (bisphenol A, bisphenol F, bisphenol S, fluorene-bisphenol, terpene-diphenol, 4,4'-dihydroxybiphenyl, 2,2'-dihydroxybiphenyl, 3,3',5,5'-tetramethyl-(1,1'-biphenyl)-4,4'-diol, hydroquinone, resorcin, naphthalenediol, tris(4-hydroxyphenyl)methane, 1,1,2,2-tetrakis(4-hydroxyphenyl)ethane and the like);

(ii) phenol resins obtained by condensing phenols (for example, phenol, alkyl-substituted phenol, naphthol, alkyl-substituted naphthol, dihydroxybenzene, dihydroxynaphthalene and the like) with aldehydes (formaldehyde, acetaldehyde, benzaldehyde, p-hydroxybenzaldehyde, o-hydroxybenzaldehyde, furfural and the like) or ketones (p-hydroxyacetophenone, o-hydroxyacetophenone and the like), or dienes such as dicyclopentadiene and tricyclopentadiene;

(iii) phenol resins obtained by polycondensing the aforementioned phenols with substituted biphenyls (4,4'-bis(chloromethyl)-1,1'-biphenyl, 4,4'-bis(methoxymethyl)-1,1'-biphenyl and the like), or substituted phenyls (1,4-bis (chloromethyl)benzene, 1,4-bis(methoxymethyl)benzene, 1,4-bis(hydroxymethyl)benzene, and the like);

(iv) modification products of the aforementioned phenols and/or the aforementioned phenol resins;

(v) halogenated phenols such as tetrabromobisphenol A and brominated phenol resins; and (e) Others such as imidazoles, $BF_3$-amine complexes and guanidine derivatives.

These agents may be used individually or in combination of two or more species.

The amount of use of the curing agent in the epoxy resin composition of the present invention is preferably 0.5 to 2.0 equivalents, and more preferably 0.6 to 1.5 equivalents, relative to one equivalent of the epoxy group of the epoxy resin.

The epoxy resin composition of the present invention may also contain a curing accelerator. Examples of the curing accelerator that can be used include imidazoles such as 2-methylimidazole, 2-ethylimidazole, 2-phenylimidazole and 2-ethyl-4-methylimidazole; tertiary amines such as 2-(dimethylaminomethyl)phenol, triethylenediamine, triethanolamine and 1,8-diazabicyclo[5,4,0]undecene-7; organic phosphines such as triphenylphosphine, diphenylphosphine and tributylphosphine; metal compounds such as tin octanoate; tetra-substituted phosphonium tetra-substituted borates such as tetraphenylphosphonium tetraphenylborate and tetraphenylphosphonium ethyltriphenylborate; tetraphenylborates such as 2-ethyl-4-methylimidazole tetraphenylborate and N-methylmorpholine tetraphenylborate; and the like. When a curing accelerator is to be used, the curing accelerator is used, as necessary, in an amount of 0.01 to 15 parts by weight relative to 100 parts by weight of the epoxy resin.

Furthermore, the epoxy resin composition of the present invention can also contain, if necessary, various compounding agents such as inorganic fillers, silane coupling agents, releasing agents and pigments, or various heat-curable resins. The inorganic fillers include, but are not limited to, powders or spherically formed beads of crystalline silica, fused silica, alumina, zircon, calcium silicate, calcium carbonate, silicon carbide, silicon nitride, boron nitride, zirconia, fosterite, steatite, spinel, titania, talc and the like. These fillers may be used individually or in combination of two or more species.

These inorganic fillers are, particularly in the case of obtaining an epoxy resin composition for semiconductor sealant, preferably used in a proportion occupying 80 to 93% of the epoxy resin composition, in view of the heat resistance, moisture resistance, mechanical properties and the like of the cured object. In this case, the remainder includes the epoxy resin of the present invention, a curing agent, and other additives that are added as necessary, and the additives include another epoxy resin, a curing accelerator and the like. The epoxy resin of the present invention occupies typically about 1 to 19%, preferably about 2 to 18%, and more preferably about 3 to 18% by weight. The remainder 1 to 9%, preferably 2 to 7%, includes a curing agent and other additives that are added as necessary.

The epoxy resin composition of the present invention is obtained by uniformly mixing the various components described above, and a preferred application thereof is a semiconductor sealant. The epoxy resin composition of the present invention can be easily made into a cured object by a method which is similar to conventionally known methods. For example, the epoxy resin composition of the present invention is obtained by sufficiently mixing the epoxy resin of the present invention and a curing agent, and if necessary, a curing accelerator, an inorganic filler, compounding agents and various heat-curable resins to a uniform state, using an extruder, a kneader, a roller or the like if necessary, and the cured object of the present invention can be obtained by molding the epoxy resin composition by melt casting, transfer molding, injection molding, compression molding or the like, and then heating to the melting point or above for 2 to 10 hours. Furthermore, for the substrate application, typically a method of curing the epoxy composition for about 20 minutes to 1.5 hours, and preferably about 45 minutes to 1 hour, can also be selected.

The epoxy resin composition of the present invention can also be used as a varnish containing a solvent. This varnish can be obtained by dissolving or uniformly dispersing a composition containing the epoxy resin of the present invention, a curing agent, and other additives as necessary, in an organic solvent such as toluene, xylene, acetone, methyl ethyl ketone or methyl isobutyl ketone. The amount of the solvent is usually 10 to 70% by weight, and preferably 15 to 65% by weight, based on the total amount of the varnish. The epoxy resin of the present invention occupies about 10 to 70% by weight, and preferably 20 to 50% by weight of the varnish, with the remainder being a curing agent, and other additives as necessary. The varnish of the present invention may be prepared as a varnish containing an inorganic filler by adding an inorganic filler to a solution containing the epoxy resin of the present invention, a curing agent, and other additives and a solvent as necessary. The varnish obtained as described above can be used to impregnate substrates such as glass fibers, carbon fibers, polyester fibers, polyamide fibers, alumina fibers or paper, followed by drying with heating, to thereby obtain a prepreg. A cured object can also be obtained by hot press molding the prepreg.

As a preferable application of the epoxy resin composition of the present invention, a sealant for semiconductor devices may be mentioned. Examples of the semiconductor devices include a dual in-line package (DIP), a quad flat package (QFP), a ball grid array (BGA), a chip size package (CSP), a small outline package (SOP), a thin small outline package (TSOP), a thin quad flat package (TQFP), and the like. Furthermore, since the epoxy resin of the present invention has less coloration and excellent light transmissibility, the epoxy resin can also be used in sealed photosemiconductor devices. In this field of photosemiconductors, the epoxy resin of the present invention can be suitably used particularly in the sealing of light emitting diodes (LED), phototransistors, charge coupled devices (CCD), and photosemiconductors (semiconductor chips) such as EPROM such as UV-EPROM.

Next, the photocurable (or photo-and-heat-curable) resin composition (photosensitive resin composition) containing the epoxy resin of the present invention will be described.

The epoxy resin of the present invention can be used as a curing agent for enhancing the reliability of the photosensitive resin composition of the present invention.

The photosensitive resin composition of the present invention contains at least the epoxy resin of the present invention and a compound having an ethylenic unsaturated group, and thus is less affected by thermal degradation, and is useful as solder resist or the like. A preferred photosensitive resin composition contains the epoxy resin of the present invention, a photopolymerization initiator and a compound having an ethylenic unsaturated group, and is more preferably a photosensitive resin composition containing the epoxy resin of the present invention, an aqueous alkali solution-soluble resin (A), a cross-linking agent having an ethylenic unsaturated group (B), and a photopolymerization initiator (C). This photosensitive resin composition can be obtained by uniformly mixing the aqueous alkali solution-soluble resin (A), cross-linking agent (B), photopolymerization initiator (C) and the epoxy resin of the present invention by a conventional method. This photosensitive resin composition may also contain the inorganic filler and the like described above, if necessary. Further, in a preferred aspect, the photosensitive resin composition contains a curing accelerator.

A preferred photosensitive resin composition contains the epoxy resin of the present invention, a photopolymerization initiator and a compound having an ethylenic unsaturated group. The respective contents of the components in this case are 20 to 80% by weight of the epoxy resin of the present invention, 10 to 70% by weight of the photopolymerization initiator, and 10 to 70% by weight of the compound having an ethylenic unsaturated group, based on the total contents of the three components.

A more preferred photosensitive resin composition is a photosensitive resin composition containing the epoxy resin of the present invention, an aqueous alkali solution-soluble resin (A), a cross-linking agent having an ethylenic unsaturated group (B) and a photopolymerization initiator (C). In this case, the respective content proportions of these four components are in the ranges of 5 to 60% by weight, preferably 5 to 40% by weight, and more preferably 10 to 30% by weight, of the epoxy resin of the present invention; 35 to 80% by weight, and preferably 40 to 75% by weight, of the aqueous alkali solution-soluble resin (A); 3 to 30% by weight, and preferably 5 to 20% by weight, of the cross-linking agent (B); and 2 to 30% by weight, and preferably 4 to 15% by weight, of the photopolymerization initiator, based on the total contents of these four components, such that the total contents of the four components would be 100% by weight. The composition may also contain an inorganic filler, a solvent or the like.

A more preferred photosensitive resin composition contains a curing accelerator, in addition to the four components. In this case, the curing accelerator is contained in an amount of typically 0.3 to 5% by weight, and preferably 0.5 to 3% by weight, based on the total contents of the four components taken as 100% by weight.

For the heat-curable resin composition, the content of the epoxy resin of the present invention is typically 1 to 50% by weight, and preferably 2 to 30% by weight, based on the total amount of the composition.

Hereinafter, the photosensitive resin composition of the present invention will be described.

The epoxy resin of the present invention which is used in the photosensitive resin composition, preferably has a melting point of 140 to 170° C.

The photopolymerization initiator will be explained in the section for photopolymerization initiator (C) that will be described later.

The compound having an ethylenic unsaturated group is not particularly limited, but compounds having a (meth)acryl group are preferred. These compounds are disclosed in Japanese Patent Application Laid-open No. 2004-155916 and the like as aqueous alkali solution-soluble resins or cross-linking agents, and thus are known compounds. In addition, the term "(meth)acryl" as used in the present specification means acryl or methacryl.

Hereinafter, the components (A) to (C) that are contained in preferred aspects of the photosensitive resin composition will be described in detail.

Aqueous alkali solution-soluble resin (A);

A resin which can be removed by dissolving in an aqueous alkali solution, can be used without any particular limitation, and any of the conventionally known aqueous alkali solution-soluble resins can be used. For example, a reaction product (an aqueous alkali solution-soluble resin having a carboxyl group) obtained by reacting an epoxycarboxylate compound, which is obtained by reacting an epoxy compound (a) having two or more epoxy groups in the molecule with a monocarboxylic acid compound (b) having an ethylenic unsaturated group in the molecule, with a polybasic acid anhydride (c), and the like may be mentioned, and for example, such compounds are described in detail in Japanese Patent Application Laid-open No. 2003-21898 and the like. Specifically, KAYARAD CCR-1159H, KAYARAD PCR-1169H, KAYARAD TCR-1310H, KAYARAD ZFR-1401H, KAYARAD ZAR-1395H (all manufactured by Nippon Kayaku Co., Ltd.), and the like may be mentioned.

Cross-linking agent (B);

Any of the conventionally known cross-linking agents consisting of compounds having an ethylenic unsaturated group may be used. Typically, a polyfunctional compound having an ethylenic unsaturated group is preferred, and (meth)acrylates having the (meth)acryl group and other functional groups are preferred. Specifically, KAYARAD HX-220, KAYARAD HX-620, KAYARAD DPHA, KAYARAD DPCA-60 (all manufactured by Nippon Kayaku Co., Ltd.) and the like may be mentioned.

Photopolymerization Initiator (C);

Any of the conventionally known photopolymerization initiators can be used. For example, benzoins, acetophenones, anthraquinones, thioxantones, ketals, benzophenones, phosphine oxides and the like may be mentioned, and specifically, KAYACURE DETX-S (manufactured by Nippon Kayaku Co., Ltd.), Irgacure 907 (manufactured by Ciba Specialty Chemicals, Inc.), and the like may be mentioned.

Furthermore, various additives, for example, fillers such as talc, barium sulfate, aluminum hydroxide, aluminum oxide, silica and clay, preferably inorganic fillers, thixotropic agents such as AEROSIL; colorants such as phthalocyanine blue, phthalocyanine green and titanium oxide, silicones, fluorine-based leveling agents or defoaming agents; polymerization inhibitors such as hydroquinone and hydroquinone monomethyl ether; and the like can be added as necessary, for the purpose of enhancing various performances of the composition.

The amount of use of the filler is, in the case of a preferred photosensitive resin composition containing the four components (epoxy resin of the present invention, aqueous alkali solution-soluble resin (A), cross-linking agent (B) and photopolymerization initiator (C)), about 0 to 100% by weight, and preferably 0 to 60% by weight, based on the total contents of these four components.

The photosensitive resin composition of the present invention may also contain a solvent as needed. Examples of solvents that can be used include ketones such as acetone, ethyl methyl ketone and cyclohexanone; aromatic hydrocarbons such as benzene, toluene, xylene and tetramethylbenzene; glycol ethers such as ethylene glycol dimethyl ether, ethylene glycol diethyl ether, dipropylene glycol dimethyl ether, dipropylene glycol diethyl ether, triethylene glycol dimethyl ether and triethylene glycol diethyl ether; esters such as ethyl acetate, butyl acetate, methylcellosolve acetate, ethylcellosolve acetate, butylcellosolve acetate, carbitol acetate, propylene glycol monomethyl ether acetate, dialkyl glutarate, dialkyl succinate and dialkyl adipate; cyclic esters such as γ-butyrolactone; petroleum-based solvents such as petroleum ether, petroleum naphtha, hydrogenated petroleum naphtha and solvent naphtha; and the like. These may be used individually or in combination of two or more species.

The amount of use of the solvent is, in the case of a preferred photosensitive resin composition containing the four components (epoxy resin of the present invention, aqueous alkali solution-soluble resin (A), cross-linking agent (B) and photopolymerization initiator (C)), about 0 to 50% by weight, and preferably 0 to 20% by weight, based on the total contents of these four components.

The epoxy resin composition of the present invention is useful as an interlayer insulating material for electronic elements, a solder resist for light waveguides which connect between optical elements or for print substrates, or a resist material for coverlays, and also can be used as color filter, printing ink, sealant, paint, coating agent, adhesive or the like.

The photosensitive resin composition of the present invention can be cured by irradiation with an energy ray such as ultraviolet rays and by a heating operation. Curing by irradiation with an energy ray such as ultraviolet rays can be performed by a conventional method. For example, in the case of irradiating ultraviolet rays, an ultraviolet generating apparatus such as a low pressure mercury lamp, a high pressure mercury lamp, an ultrahigh pressure mercury lamp, a xenon lamp or an ultraviolet emitting laser (excimer laser or the like) may be favorably used. Thereafter, the resin composition is further irradiated with ultraviolet rays if necessary, and then heated at a temperature of typically 100 to 200° C., and preferably 140 to 180° C. Thereby, the cured object of the present invention can be obtained.

The cured object of the photosensitive resin composition of the present invention is used in printed wire boards as a resist film, an interlayer insulating material for the build-up technique, or a light waveguide, or because of its particularly excellent optical properties, is used in electric, electronic or optical base materials such as optoelectronic substrates or optical substrates. Examples of specific articles using these include computers, electric appliances, portable instruments and the like.

Specifically, for example, in the case of producing a printed wire board using the photosensitive resin composition, the photosensitive resin composition of the present invention is first applied on a substrate for printed wire boards by a method such as screen printing, spraying, roll coating, electrostatic coating or curtain coating, to a film thickness of 0.5 to 160 µm, and the coating film is dried typically at 50 to 110° C., and preferably at 60 to 100° C., to thus form a coating film. Subsequently, the coating film is irradiated directly or indirectly with a high energy ray such as ultraviolet rays, typically at an intensity of about 10 to 2000 mJ/cm$^2$, through a photomask on which an exposure pattern has been formed, such as a negative film, and the unexposed areas are developed using a developer solution that will be described later, for example, by spraying, oscillating immersion, brushing, scrubbing or the like. Subsequently, further irradiation with ultraviolet rays is performed as necessary, and then a heat treatment typically at 100 to 200° C., and preferably at 140 to 180° C. Thereby, a printed wire board having a permanent protective film which has excellent gold plating properties and thus satisfies various properties such as heat resistance, solvent resistance, acid resistance, adhesiveness and flexibility, is obtained.

As the aqueous alkali solution used in the development described above, an inorganic aqueous alkali solution of potassium hydroxide, sodium hydroxide, sodium carbonate, potassium carbonate, sodium hydrogen carbonate, potassium hydrogen carbonate, sodium phosphate or potassium phosphate, or an organic aqueous alkali solution of tetramethylammonium hydroxide, tetraethylammonium hydroxide, tetrabutylammonium hydroxide, monoethanolamine, diethanolamine or triethanolamine, can be used.

EXAMPLES

Next, the present invention will be described in more detail by way of Examples. Hereinafter, unless stated otherwise, the "parts" means parts by weight, and "%" means % by weight. Further, the properties of the resin were measured under the following conditions.

Softening Point

It was measured by the method described in JIS K-7234.

Epoxy Equivalent

It was measured by the method described in JIS K-7236, and the unit is g/eq.

Melting point: DSC method (extrapolated point is taken as the melting point)

EXSTAR6000 manufactured by Seiko Instruments, Inc.,

Sample for measurement: 2 mg to 5 mg, rate of temperature increase: 10° C./min.

Gel permeation chromatography (data of the measurement results are presented in % by area (G))

Column: Shodex SYSTEM-21 column KF-804L+KF-803L (×two columns), 40° C., coupling eluent: tetrahydrofuran, Flow rate: 1 ml/min., Detection: UV 254 nm, Calibration curve: standard polystyrene manufactured by Shodex was used.

High performance liquid chromatography (data of the measurement results are presented in % by area (H))

Column: Intersil ODS-2, 5 µm, 2.1×250 mm 40° C.,

Mobile Phase A: acetonitrile (AN), Mobile Phase B: water (W),

Time Program:

0 to 20 min. AN/W=50%/50%→90%/10%

20 to 40 min. AN/W=90%/10%

Flow rate: 0.2 ml/min, Detection: UV 254 nm,

TOF MS

Total Chlorine Content

A value obtained by adding a 1 N KOH-propylene glycol solution to a butylcarbitol solution of a sample, refluxing the mixture for 10 minutes, to thereby measure the amount (moles) of free chlorine by a silver nitrate titration method, and dividing the value by the weight of the sample.

Synthesis Example 1

While a flask equipped with a thermometer, a dropping funnel, a condenser tube and a stirrer was purged with nitrogen gas, 99.5 parts of a condensate of glyoxal and phenol (TEP-DF manufactured by Asahi Organic Chemicals Industry Co., Ltd., content of tetrakisphenolethane: 99% by area (G) or more), 460 parts of epichlorohydrin, and 100 parts of methanol were introduced to the flask, and the mixture was allowed to dissolve by elevating the temperature to about 70° C. while stirring. Subsequently, 41 parts of sodium hydroxide flakes were added in divided portions over 90 minutes, and then the mixture was allowed to react further at a reflux temperature for 1 hour. After completion of the reaction, 250 parts of water was added to perform washing with water, and generated salts and the like were removed. Then, while stirring and heating under reduced pressure (about 70° C., −0.08 MPa to −0.09 MPa), excess epichlorohydrin and the like were distilled off over 3 hours, and the resin concentration was made to about 50%. Furthermore, 250 parts of acetone and 155 parts of methanol were added to the residual solution, the mixture was stirred for 1 hour, and then 310 parts of water was slowly added thereto. The mixture was cooled to room temperature, and then filtered under reduced pressure, to thus obtain an epoxy resin of the present invention. Furthermore, these crystals were sufficiently washed with 100 parts of methanol and 300 parts of water, and dried, to obtain 142 parts (yield 92%) of an epoxy resin of the present invention (EP1) (epoxy equivalent: 169 g/eq., melting point: 177° C., content of tetranuclear species: 79% by area (G), content of octanuclear species: 17% by area (G), containing 69% by area (H) of the compound of formula (1). Total chlorine content: 3220 ppm) as powdered crystals. The amount of residual solvent was 500 ppm or less.

The crystals were also observed with a microscope, and the particle size of the obtained crystals was almost 50 to 100 μm in diameter.

Synthesis Comparative Example 1

While a flask equipped with a thermometer, a dropping funnel, a condenser tube and a stirrer was purged with nitrogen gas, 99.5 parts of a condensate of glyoxal and phenol (TEP-DF manufactured by Asahi Organic Chemicals Industry Co., Ltd., content of tetrakisphenolethane: 99% by area (G) or more), 460 parts of epichlorohydrin, and 100 parts of methanol were introduced to the flask, and the mixture was allowed to dissolve by elevating the temperature to about 70° C. while stirring. Subsequently, 40 parts of sodium hydroxide flakes were added in divided portions over 90 minutes, and then the mixture was allowed to react further at a reflux temperature for 1 hour. After completion of the reaction, washing with water was performed until the washing water turned neutral, generated salts and the like were removed, and then the solvent was distilled off by heating under reduced pressure. 310 parts of toluene was added to the resulting residual liquid, to dissolve the mixture under reflux. Furthermore, 310 parts of methyl isobutyl ketone and 93 parts of cyclohexane were added, and the mixture was left statically to cool to room temperature, to precipitate out colorless crystals. The precipitated crystals were filtered under reduced pressure, to obtain an epoxy resin for comparison. Furthermore, these crystals were sufficiently washed with 300 parts of methanol and 300 parts of water, and dried, to obtain an epoxy resin for comparison (EP2) (epoxy equivalent: 163 g/eq., melting point: 179° C., content of tetranuclear species: 98% by area (G), content of octanuclear species: 2% by area (G), containing 86% by area (H) of the compound of formula (1). Total chlorine content: 3910 ppm) as powdered crystals. The yield amount was 79 parts, and the yield was 51%, which was a low yield. The amount of residual solvent was 9700 ppm.

The crystals were also observed with a microscope, and the particle size of the obtained crystals was 400 to 800 μm in diameter.

Synthesis Comparative Example 2

While a flask equipped with a thermometer, a dropping funnel, a condenser tube and a stirrer was purged with nitrogen gas, 99.5 parts of a condensate of glyoxal and phenol (TEP-DF manufactured by Asahi Organic Chemicals Industry Co., Ltd., content of tetrakisphenolethane: 99% by area (G) or more), 460 parts of epichlorohydrin, and 100 parts of methanol were introduced to the flask, and the mixture was allowed to dissolve by elevating the temperature to about 70° C. while stirring. Subsequently, 40 parts of sodium hydroxide flakes were added in divided portions over 90 minutes, and then the mixture was allowed to react further at a reflux temperature for 1 hour. After completion of the reaction, washing with water was performed by adding 250 parts of water, generated salts and the like were removed, and then 250 parts of water was added thereto. Epichlorohydrin was azeotropically distilled off up to 110° C., and as a result, an aqueous dispersion of white clumps (2 to 20 mm in diameter) of crystals was produced. 100 parts of acetone was added thereto while stirring, and stirring was continued at 80° C. for 2 hours. As a result, an aqueous dispersion of finely powdered crystals was obtained. When this was filtered, the desired epoxy resin was obtained. Furthermore, these crystals were washed sufficiently with a mixed solution of 100 parts of methanol and 300 parts of water, and dried, to obtain 139 parts (yield: 90%) of an epoxy resin for comparison (EP3) (epoxy equivalent: 168 g/eq., melting point: 178° C., content of tetranuclear species: 76% by area (G), content of octanuclear species: 17% by area (G), containing 71% by area (H) of the compound of formula (1).) as powdered crystals. The amount of residual solvent was 500 ppm or less. The total chlorine content was 9900 ppm.

The crystals were also observed with a microscope, and the particle size of the obtained crystals was 200 to 400 μm in diameter.

Synthesis Comparative Example 3

While a flask equipped with a thermometer, a dropping funnel, a condenser tube and a stirrer was purged with nitrogen gas, 99.5 parts of a condensate of glyoxal and phenol (TEP-DF manufactured by Asahi Organic Chemicals Industry Co., Ltd., content of tetrakisphenolethane: 99% by area (G) or more), 460 parts of epichlorohydrin, and 100 parts of methanol were introduced to the flask, and the mixture was allowed to dissolve by elevating the temperature to about 70° C. while stirring. Subsequently, 40 parts of sodium hydroxide flakes were added in divided portions over 90 minutes, and then the mixture was allowed to react further at a reflux temperature for 1 hour. After completion of the reaction, washing with water was performed by adding 250 parts of water, generated salts and the like were removed, and then 250 parts of dimethylsulfoxide was added thereto. While stirring and heating under reduced pressure (about 70° C., −0.08 MPa to −0.09 MPa), excess epichlorohydrin and the like were distilled off over 3 hours. While maintaining the residual solution at 50° C., 100 parts of methanol was added, and the mixture was stirred for 15 minutes. Then, the temperature was raised to 70° C., and 500 parts of water was slowly added thereto. The mixture was cooled to room temperature, and then filtered under reduced pressure, to thus obtain an epoxy resin of the present invention. Furthermore, these crystals were sufficiently washed with a mixed solution of 100 parts of methanol and 300 parts of water, and dried, to obtain 142 parts (yield: 92%) of an epoxy resin for comparison (EP4) (epoxy equivalent: 170 g/eq., melting point 177° C., content of tetranuclear species: 78% by area (G), content of octanuclear species: 17% by area (G), containing 71% by area (H) of the compound of formula (1).) as powdered crystals. The amount of residual solvent was as large as 9700 ppm, and the total chlorine content was also as high as 6960 ppm.

The crystals were also observed with a microscope, and the particle size of the obtained crystals was 200 to 600 μm in diameter.

Example 1 and Comparative Example 1
(Comparison of Purity)

The epoxy resin (EP 1) obtained in Synthesis Example 1 or the epoxy resin (EP2) obtained in Synthesis Comparative Example 1, as an epoxy resin, and KAYAHARD MCD (acid anhydride-based curing agent manufactured by Nippon Kayaku Co., Ltd.) as a curing agent were mixed at the composition indicated in the following Table 1, and the mixture was uniformly dispersed, to obtain a crystal-dispersed type resin composition for each epoxy resin. The temperature of the composition was increased stepwise in a vacuum dryer, and thereby the temperature at which the obtained epoxy resin composition became uniformly compatibilized was checked. The results are presented in Table 2.

TABLE 1

| Composition of mixture | | |
|---|---|---|
| | Example 1 | Comparative Example 1 |
| Epoxy resin (EP1) | 10 | |
| Epoxy resin (EP2) | | 10 |
| KAYAHARD MCD | 8.0 | 8.4 |

TABLE 2

| | Epoxy resin | 50° C. | 100° C. | 120° C. | 130° C. | 140° C. |
|---|---|---|---|---|---|---|
| Example 1 | EP1 | X | X | ○ | ○ | ○ |
| Comparative Example 1 | EP2 | X | X | X | Δ | ○ |

\* Dissolution state (determined by eye observation)
○: Completely dissolved
Δ: Almost dissolved, slight clouding
X: Undissolved Example 2 and Comparative Example 2
(Comparison of Epoxy Resin Compositions)

The epoxy resin (EP1) obtained in Synthesis Example 1 or the epoxy resin (EP2) obtained in Synthesis Comparative Example 1, as an epoxy resin, phenol novolac (softening point: 83° C., hydroxyl group equivalent: 106 g/eq) as a curing agent, and triphenylphosphine (TPP) as a curing accelerator, were mixed at a composition indicated in the following Table 3-1 (composition of mixture). A resin molded product was prepared by transfer molding, and was cured for 2 hours at 120° C., 2 hours at 140° C., and 6 hours at 180° C. The glass transition temperature, water absorption and impact resistance of this specimen were tested, and the results are presented in Table 3-2 (properties of cured object).

Further, the measurement of the property values were performed by the following methods.

Glass transition temperature (TMA):
TM-7000 manufactured by Ulvac Riko, Inc., rate of temperature increase: 2° C./min.

Water absorption: Rate of weight increase (%) obtained after boiling a disk-shaped specimen having a diameter of 5 cm and a thickness of 4 mm in water at 100° C. for 72 hours.

IZOD impact test: Method described in JIS K-6911.

TABLE 3-1

| | Composition of mixture | |
|---|---|---|
| | Example 2 | Comparative Example 2 |
| Epoxy resin (EP1) | 50 | |
| Epoxy resin (EP2) | | 50 |
| Phenol novolac | 32 | 33 |
| TPP | 0.5 | 0.5 |

TABLE 3-2

| | Properties of cured object | |
|---|---|---|
| | Example 2 | Comparative Example 2 |
| Glass transition temperature (° C.) | 196 | 197 |
| Water absorption (% by weight) | 2.0 | 2.8 |
| IZOD impact test (KJ/m) (Average of three measurements) | 13 | 9 |

From the results shown above, it was found that the epoxy resin of the present invention is, when prepared into an epoxy resin composition, highly compatible with other components, and forms a uniform cured object, as compared with known epoxy resins, and the cured object formed by curing the epoxy resin composition of the present invention has equivalent heat resistance compared to known epoxy resins. Also, it was found that a cured object having low water absorption, excellent water resistance and excellent impact resistance is obtained.

Test Example 1 (Comparison of Influence of Residual Solvent)

20 parts of the epoxy resin (EP1) obtained in Synthesis Example 1 and 20 parts of the epoxy resin (EP3) obtained in Synthesis Comparative Example 2, as an epoxy resin, was spread on a petri dish, and was left to stand for 2 days in a hot air dryer at 100° C.

There were no observable changes in the color of EP1, and remained as white powdered crystals. However, EP3 turned yellow, and formed a cream-colored crystal powder, with brown-colored parts being partially seen.

Test Example 2

Comparison of Dispersibility of Crystals

The epoxy resin (EP 1) obtained in Synthesis Example 1 or the epoxy resins (EP2, 3, 4) obtained in Synthesis Comparative Examples 1 to 3 was used. 16 part of DPHA (dipentaerythritol polyacrylate manufactured by Nippon Kayaku Co., Ltd.) was added to 4 parts of the epoxy resin, and the mixture was kneaded (three times of kneading) with a triple roll mill. The particle size gauge was used to compare the dispersibility. The results are presented in Table 4 (n in Table 4 represents the test number).

TABLE 4

| | Particle size of residue | | |
|---|---|---|---|
| | n = 1 | n = 2 | n = 3 |
| EP1 | 0 | 0 | 0 |
| EP2 | 25 μm, 15 μm | 25 μm, | 17.5 μm, 10 μm |
| EP3 | 17.5 μm, 5 μm | 15 μm, 12.5 μm | 15 μm |
| EP4 | 10 μm, | 10 μm, 5 μm | 7.5 μm |

From the above results, it was found that the epoxy resin of the present invention had excellent dispersibility.

Example 3 and Comparative Example 3

Comparison of Photosensitive Resin Compositions and Cured Objects Thereof

The epoxy resin (EP1) obtained in Synthesis Example 1 or the epoxy resin (EP2) obtained in Synthesis Comparative Example 1 was used to mix at the mixing proportions indicated in Table 5, and the mixture was kneaded with a triple roll mill, to obtain the epoxy resin composition of the present invention or an epoxy resin composition for comparison. This was applied on a printed board having a size of about 10 cm for each side, by a screen printing method, so that the thickness of dried film would be 15 to 25 μm, and the coating film was dried in a hot air dryer at 80° C. for 30 minutes. Subsequently, the coating film was irradiated with ultraviolet rays through a mask having a circuit pattern drawn thereon, using an ultraviolet exposure unit (manufactured by ORC Manufacturing Co., Ltd., Model HMW-680GW). Then, spray development was performed using a 1 wt % aqueous sodium carbonate solution to remove the resin at the parts not irradiated with ultraviolet rays. The printed board was washed with water, dried, and then was subjected to a heat curing reaction in a hot air dryer at 150° C. for 60 minutes, to obtain a cured film. The results are presented in Table 6. Further, the testing methods and evaluation criteria for various tests are as follows.

Tackiness: The dried film applied on the board was rubbed with absorbent cotton, and tackiness of the film was evaluated.

○: Absorbent cotton does not stick.

X: Absorbent cotton waste sticks to the film.

Thermal stability: The developability of when the drying time at 80° C. was set to 30 minutes and 50 minutes, was evaluated, and the following evaluation criteria were used. During the development, evaluation was performed based on the time taken until ink was completely removed, and development could be performed.

○: Within 60 seconds

X: 60 seconds or more.

Resolution: A negative pattern of 50 μm was closely adhered onto the dried coating film, and exposure was performed by irradiating the coating film with ultraviolet rays at a cumulative dose of 300 mJ/cm². Subsequently, development was performed with a 1 wt % aqueous sodium carbonate solution for 60 seconds at a spray pressure of 2.0 kg/cm², and the transferred pattern was observed with a microscope. The following criteria were used.

○: Resolved pattern had linear pattern edges.

X: Peeling occurred, or pattern edges were irregular.

Photosensitivity: A step tablet with 21 steps (manufactured by Kodak Corp.) was closely adhered onto the dried coating film, and exposure was performed by irradiating the coating film with ultraviolet rays at a cumulative dose of 500 mJ/cm². Subsequently, development was performed with a 1 wt % aqueous sodium carbonate solution for 60 seconds at a spray pressure of 2.0 kg/cm², and the number of steps remaining undeveloped was checked.

Adhesiveness: 100 squares having a size of 1 mm for each edge were made on a specimen, and a peeling test using a cellophane adhesive tape was performed. Evaluation was performed based on the number of resist masses adhering to the specimen. The results were described using the following criteria.

○: 100/100 No abnormality

Δ: 100/100, However, peeling was seen at the corners and edge parts.

X: ≦99/100

Heat resistance: A rosin-based flux was applied to a specimen, and the specimen was immersed in a solder bath at 260° C. for 5 seconds. This operation was considered as one cycle, and three cycles were repeated. The specimen was left to cool to room temperature, a peeling test using a cellophane adhesive tape(R) was performed, and evaluation was performed under the following criteria.

○: No abnormality was seen from the external appearance of the coating film, and no blister or peeling was observed.

Δ: Slight blisters or peeling was seen.

X: Blisters or peeling was present in the coating film.

TABLE 5

| | | Example 3 | Comparative Example 3 |
|---|---|---|---|
| Epoxy resin | EP1 | 11.0 | |
| | EP2 | | 11.0 |
| Aqueous alkali solution-soluble resin | | | |
| CCR-1159H *1 | | 46.5 | 46.5 |
| Cross-linking agent | | | |
| DPHA *2 | | 6.1 | 6.1 |
| Photopolymerization initiator | | | |
| Irgacure 907 *3 | | 4.5 | 4.5 |
| DETX-S *4 | | 0.9 | 0.9 |
| Heat curing catalyst | | | |
| Melamine | | 0.8 | 0.8 |
| Filler | | | |
| Barium sulfate | | 24.2 | 24.2 |
| Phthalocyanine Blue | | 0.45 | 0.45 |
| Additives | | | |
| BYK-354 *5 | | 0.61 | 0.39 |
| KS-66 *6 | | 1.21 | 1.21 |
| Solvent | | | |
| CA | | 4.54 | 4.54 |

Remarks:
*1 manufactured by Nippon Kayaku Co., Ltd.: Cresol novolac type aqueous alkali solution-soluble resin
*2 manufactured by Nippon Kayaku Co., Ltd.: Dipentaerythritol polyacrylate
*3 manufactured by Vantico, Ltd.: 2-Methyl-(4-(methylthio)phenyl)-2-morpholino-1-propane
*4 manufactured by Nippon Kayaku Co., Ltd.: 2,4-Diethylthioxantone
*5 manufactured by BYK Chemie GmbH: Leveling agent
*6 manufactured by Shin-Etsu Chemical Co., Ltd.: Defoaming agent

TABLE 6

|  | Example 3 | | Comparative Example 3 | |
|---|---|---|---|---|
|  | Prebake time | | | |
|  | 30 min | 50 min | 30 min | 50 min |
| Tackiness | ○ | ○ | ○ | ○ |
| Thermal stability | ○ | ○ | ○ | ○ |
| Photosensitivity | 7 | 7 | 7 | 7 |
| Resolution | ○ | ○ | ○ | ○ |
| Adhesiveness | ○ | ○ | Δ | Δ |
| Heat resistance | ○ | ○ | ○ | ○ |

From the results shown above, the photosensitive resin composition of the present invention showed sufficient thermal stability compared with the photosensitive resin compositions for comparison, and equivalent results were obtained for tackiness, thermal stability, photosensitivity, resolution, adhesiveness and heat resistance. It was also obvious that an improvement in the adhesiveness was observed.

The invention claimed is:

1. An epoxy resin obtained by glycidylating a phenol compound which contains 1,1,2,2-tetrakis(hydroxyphenyl)ethane in an amount of 95% by area or more based on the measurement by gel permeation chromatography with epihalohydrin in the presence of an alcohol selected from the group consisting of methanol, ethanol, propyl alcohol and butanol, and in the presence of an alkali metal hydroxide, recovering excess epihalohydrin with heating at from 40 to 140° C. under reduced pressure leaving the solution with a resin concentration of 40 to 90% by weight, adding a water-soluble solvent selected from the group consisting of acetone, ethyl lactate, methanol, ethanol, isopropanol, n-propanol, n-butanol and t-butanol to prepare a water-soluble solution or suspension, and adding water in an amount of 20 to 500% by weight based on the theoretical yield of the epoxy resin to precipitate out the crystals of the epoxy resin, wherein the content proportion of a tetranuclear species consisting of 1,1,2,2-tetrakis(glycidyloxyphenyl)ethane is 50 to 90% by area, and the content proportion of an octanuclear species represented by the following formula (2):

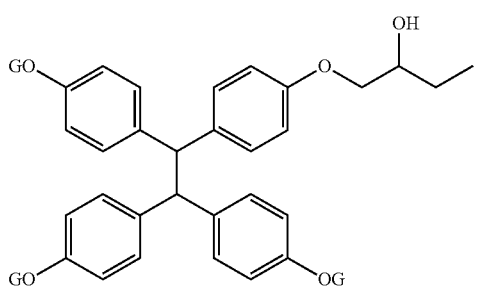

(2)

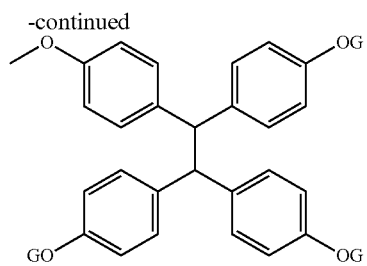

-continued

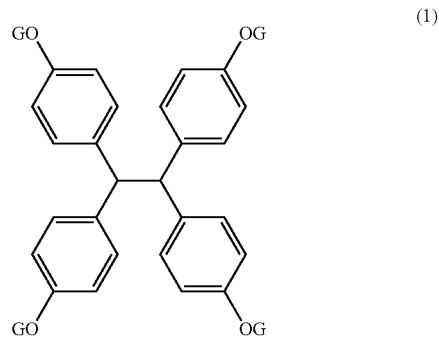

wherein G represents a glycidyl group, is 5% by area or more, both based on the measurement by gel permeation chromatography, and the total chlorine content is 5000 ppm or less, and the amount of solvent is 500 ppm or less.

2. The epoxy resin according to claim 1, wherein the content proportion of an epoxy compound having a skeleton represented by the following formula (1):

(1)

wherein G represents a glycidyl group, is 50 to 75% by area based on the measurement by high performance liquid chromatography, and the content proportion of the octanuclear species is 5 to 35% by area based on the measurement by gel permeation chromatography.

3. An epoxy resin composition containing the epoxy resin according to claim 1 or 2, and a curing agent.

4. A photosensitive resin composition containing the epoxy resin according to claim 1 or 2, and a compound having an ethylenic unsaturated group.

5. A cured object obtained by curing the epoxy resin composition or photosensitive resin composition according to claim 3.

6. A cured object obtained by curing the epoxy resin composition or photosensitive resin composition according to claim 4.

* * * * *